US008701867B2

(12) United States Patent
Costanzo et al.

(10) Patent No.: US 8,701,867 B2
(45) Date of Patent: Apr. 22, 2014

(54) CONVEYOR WITH A GENTLE RETRACTABLE STOP

(75) Inventors: Mark Costanzo, River Ridge, LA (US); Eric M. Pressler, New Orleans, LA (US); Felix H. Lapeyre, III, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 529 days.

(21) Appl. No.: 13/000,236

(22) PCT Filed: Jun. 25, 2009

(86) PCT No.: PCT/US2009/048667
§ 371 (c)(1), (2), (4) Date: Dec. 20, 2010

(87) PCT Pub. No.: WO2009/158504
PCT Pub. Date: Dec. 30, 2009

(65) Prior Publication Data

US 2011/0108396 A1 May 12, 2011

Related U.S. Application Data

(60) Provisional application No. 61/076,014, filed on Jun. 26, 2008.

(51) Int. Cl.
*B65G 47/00* (2006.01)
*A01K 31/16* (2006.01)
*B65G 47/88* (2006.01)
*B65G 47/29* (2006.01)

(52) U.S. Cl.
CPC ........... *A01K 31/165* (2013.01); *B65G 47/8815* (2013.01); *B65G 47/29* (2013.01)
USPC ...................... 198/531; 198/459.6; 198/463.4

(58) Field of Classification Search
USPC .......... 198/345.1, 419.1, 459.6, 459.7, 463.4, 198/368, 457.05, 370.08, 442, 456, 633, 198/636, 637, 457.06, 457.07
See application file for complete search history.

(56) References Cited

U.S. PATENT DOCUMENTS

| | | | | |
|---|---|---|---|---|
| 2,306,101 | A * | 12/1942 | Van Zandt | 193/35 A |
| 2,675,119 | A * | 4/1954 | Birch | 198/459.6 |
| 2,980,222 | A * | 4/1961 | Crosby | 193/35 A |
| 3,093,236 | A * | 6/1963 | McLaughlin | 198/370.08 |
| 3,550,756 | A * | 12/1970 | Kornylak | 198/637 |
| 4,082,174 | A * | 4/1978 | Stobb | 198/368 |
| 4,489,824 | A * | 12/1984 | Scourtes | 198/633 |
| 4,711,357 | A * | 12/1987 | Langenbeck et al. | 209/565 |
| 5,168,976 | A * | 12/1992 | Kettelson | 198/345.3 |
| 5,211,276 | A * | 5/1993 | Clopton | 198/345.3 |
| 6,102,190 | A * | 8/2000 | Haas et al. | 198/633 |
| 6,164,430 | A * | 12/2000 | Nishimura | 198/345.1 |
| 6,568,522 | B1 | 5/2003 | Boelaars | |
| 7,147,097 | B2 | 12/2006 | Lemm | |
| 7,306,086 | B2 | 12/2007 | Boelaars | |
| 2007/0284220 | A1 | 12/2007 | Riddick et al. | |
| 2008/0067038 | A1 | 3/2008 | Fourney | |
| 2009/0223779 | A1* | 9/2009 | Szarkowski et al. | 198/370.08 |

* cited by examiner

*Primary Examiner* — William R Harp
(74) *Attorney, Agent, or Firm* — James T. Cronvich

(57) ABSTRACT

A conveyor having a retractable stop providing a nonsliding contact surface to the leading faces of conveyed articles to prevent damage to the faces of the articles. One version of such a stop has a contact surface defined by the peripheries of rollers that rotate on the accumulated articles as the stop moves from a blocking position accumulating articles on the conveyor to a retracted position releasing accumulated articles to advance downstream along the conveyor.

4 Claims, 6 Drawing Sheets

CONVEYOR WITH A GENTLE RETRACTABLE STOP

BACKGROUND

The invention relates generally to power-driven conveyors and, more particularly, to conveyors having retractable stops to selectively accumulate and release conveyed articles.

Conveyors are used in industrial applications to transport articles from one processing station to another. Often a continuously moving conveyor is used to deliver articles to a downstream processing station. As soon as the supply of articles exceeds the handling capacity of the downstream processing station, a stop mechanism is moved into position to block the articles at a position on the conveyor upstream of the processing station. Friction between the conveying surface and the backed-up, or accumulated, articles causes the articles to push against each other. The pressure exerted against the articles at the front of the group of accumulated articles is called back line pressure. As more articles back up, the back line pressure increases. Back line pressure can cause damage to the articles, excessively load the conveyor belt and its drive components, and accelerate belt wear. Even when the conveyor includes freely rotatable rollers to reduce friction, the pressure from a large number of backed-up products can be significant. And, when the stop mechanism, which is typically a flat plate, is moved into the blocking position and, especially, out of the blocking position, it slides on the articles at the head of the accumulation. The sliding friction of the stop mechanism against the articles can scratch or otherwise damage their surfaces or labels as the stop mechanism retracts to release the accumulated articles.

Thus, there is a need for a conveyor that can accumulate and release conveyed articles without damaging accumulated articles or damaging their surfaces.

SUMMARY

This need and other needs are satisfied by a conveyor embodying features of the invention. One version of such a conveyor comprises a conveying surface conveying articles in a conveying direction. A retractable stop is disposed along the conveying surface. The stop moves in a direction of motion between a blocking position stopping conveyed articles from advancing on the conveying surface in the conveying direction and a retracted position allowing conveyed articles to be conveyed on the conveying surface. The retractable stop has a contact surface positioned to contact conveyed articles without sliding on conveyed articles as the retractable stop moves between the blocking and retracted positions.

Another version of a conveyor embodying features of the invention comprises a conveying surface conveying articles in a conveying direction. A stop disposed along the conveying surface is movable between a first position and a second position. The stop has a contact surface arranged to contact conveyed articles without sliding against the conveyed articles as the stop moves between the first and second positions.

DETAILED DESCRIPTION

Figure 1A:
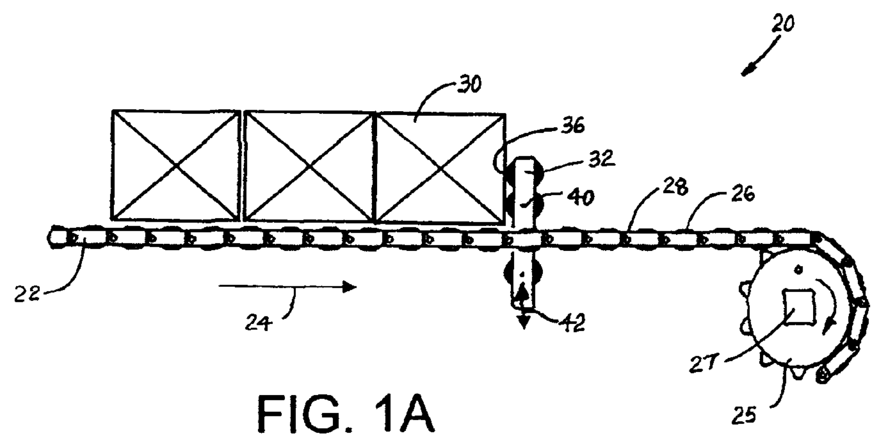
FIGS. 1A and 1B are side elevation views of a portion of a conveyor embodying features of the invention including a vertically sliding stop shown first in a blocking, accumulation position and second in a retracted, release position.
Figure 1B:
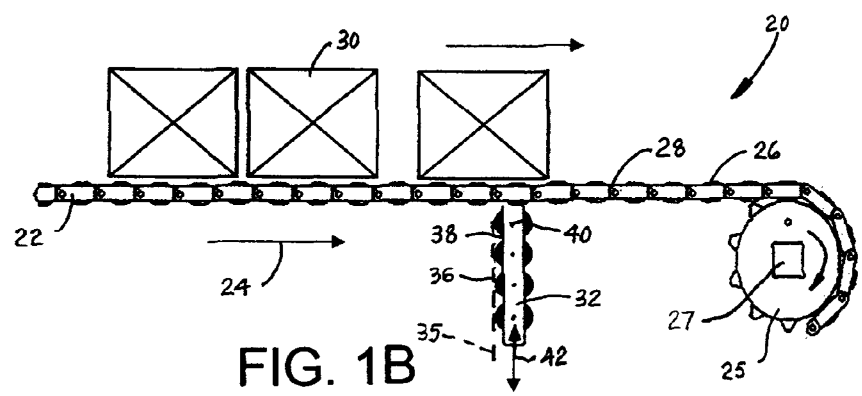
Figure 2:
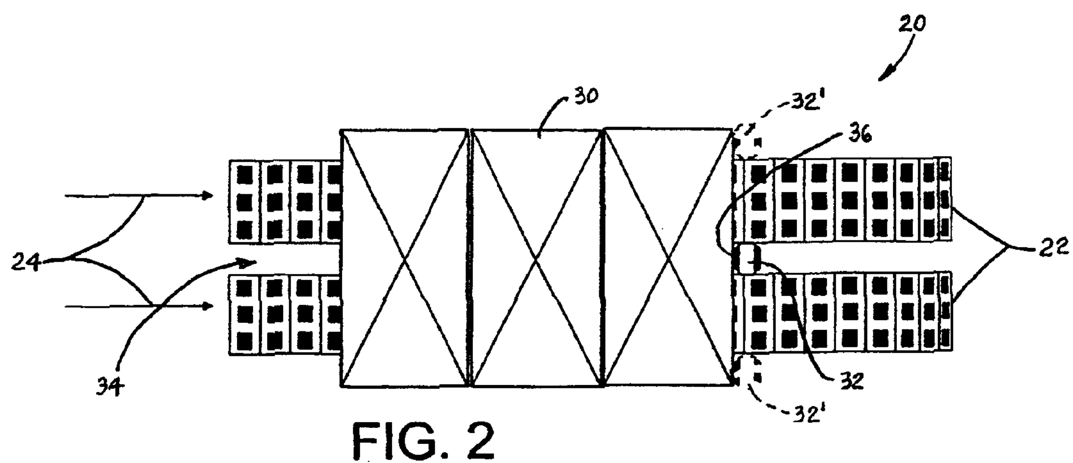
FIG. 2 is a top plan view of the conveyor of FIG. 1.

One version of a portion of an accumulation-and-release conveyor embodying features of the invention is shown in FIGS. 1A-1B and 2. The conveyor 20 comprises a pair of roller-top conveyor belts 22 advancing in a conveying direction 24 along an upper carryway. The belts are driven conventionally by drive sprockets 25 mounted on rotating drive shafts 27 driven by a motor (not shown). The roller-top belts have belt rollers 26 that protrude above upper conveying surfaces 28 of the belts. Articles 30 ride atop the rollers on both belts. A retractable stop 32 is positioned in a gap 34 separating the two conveyor belts. The stop has a contact surface 35 that, in this example, is defined as an area on the peripheries of rollers 36 mounted on an upstream face 38 of the stop. The rollers on the stop are mounted on axles 40 defining axes of rotation perpendicular to the conveying direction 24 and to the vertical direction of motion 42 of the stop as it translates between an article-blocking position, as in FIG. 1A, and an article-release position, as in FIG. 1B.

When conveyed articles are blocked by the stop, as in FIG. 1A, the blocked articles accumulate upstream of the stop. The freely rotatable belt rollers provide a low-friction rolling surface to the bottom of the accumulated articles as the belt runs by. A conveyor belt without belt rollers, but with a slick enough conveying surface, may be substituted for the roller belt in some applications. As shown in FIG. 1B, when the stop is lowered from its blocking position to a retracted position in the direction of motion 42, the articles bearing against the stop are advanced forward in the conveying direction. The rollers 36 on the stop roll, rather than slide, on the articles in the direction of the stop's motion as the stop is retracted or extended to prevent damage to the outer faces of the articles. The central stop 32 could be supplemented by optional flanking stops 32' at the sides of the conveyor as shown in FIG. 2.

Figure 3:
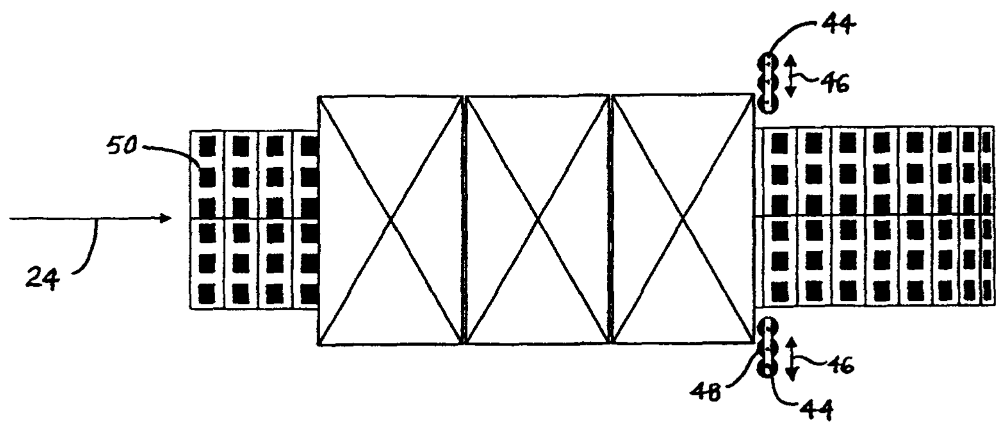
FIG. 3 is a top plan view of another version of a conveyor having horizontally sliding stops.

Another version of a stop is shown in FIG. 3. In this version, two stops 44 flanking the conveyor translate horizontally between blocking and retracted positions as indicated by arrows 46. The peripheries of rollers 48 define an upstream contact surface against which accumulated articles rest when the stop is in the blocking position. Because this stop translates from the side of the conveyor, it does not require a gap in the conveying surface, as in FIG. 2. Consequently, the conveying surface could be formed by a single conveyor belt 50, or by laterally abutting belts. The rollers in the stop rotate on vertical axes perpendicular to both the conveying direction 24 and the direction of motion 46 of the stop.

Figure 4:
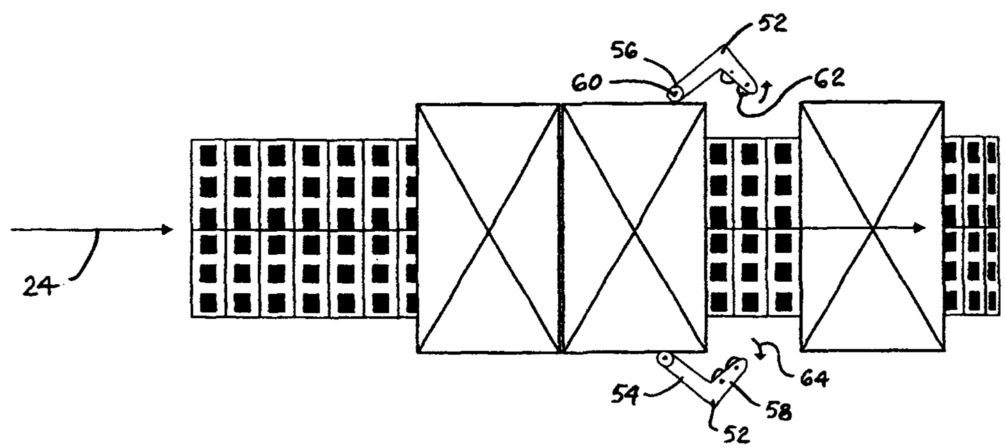
FIG. 4 is a top plan view of yet another version of a conveyor having stops that pivot about a vertical axis.

Another kind of stop is shown in FIG. 4. In this example, the sliding side stops of FIG. 3 are replaced with pivoting stops 52. These stops are hook-shaped, each with a shank portion 54 attached at one end to a pivot 56 and at the other end to a hook portion 58. The pivot pivots on a vertical axis 60. To make the contact between the conveyed articles and the stops gentler as the stops pivot to the refracted, product-release position, the inner sides of the hook portions are equipped with rollers 62 that rotate on vertical axes perpendicular to the conveying direction 24 and to the direction of motion 64 of the stop. The rolling contact between the faces of the conveyed articles and the rollers as the stop pivots to release the articles prevents the stop from scratching the faces of the articles as they pass. Because the pivoting hook generally contacts only a corner of a rectangular article, rollers on the stop may not be necessary in applications such as conveying boxes or cartons.

Figure 5:
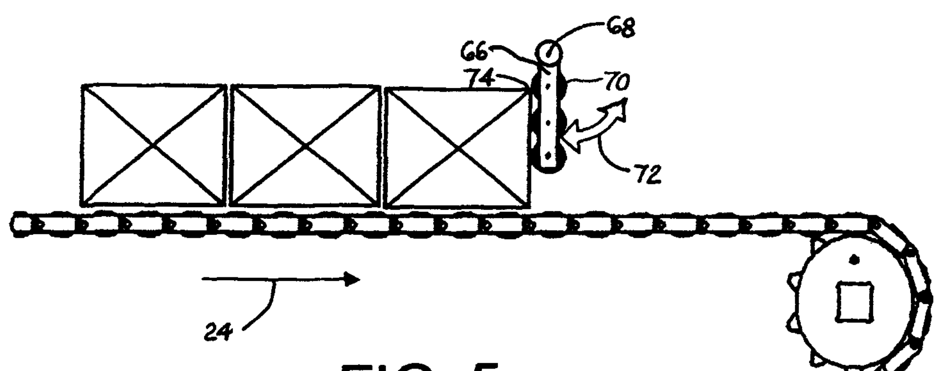
FIG. 5 is a side elevation view of another version of a conveyor having a stop that pivots about a horizontal axis above the conveying surface.

Another pivoting stop is shown in FIG. 5. The stop 66 pivots about a horizontal axis 68 above the level of the conveyor. Rollers 70 form the upstream contact surface of the stop. As the stop swings from the blocking position to the retracted position as indicated by arrow 72, the leading top edge 74 of the articles rolls on the rollers in gentle contact.

Figure 6A:
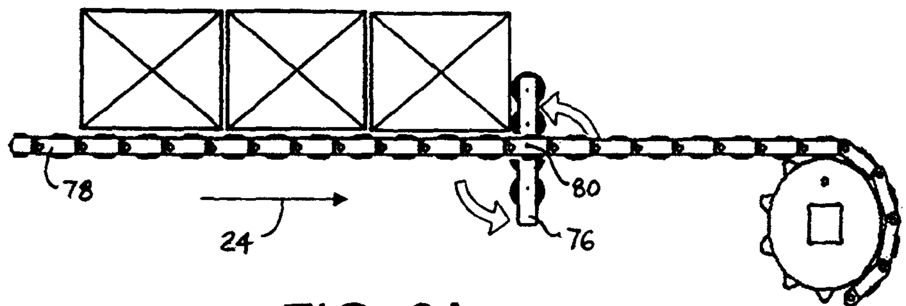
FIGS. 6A and 6B are side elevation views of another version of a conveyor having a stop that pivots about a horizontal axis generally in the plane of the conveying surface, shown in accumulation and release positions.
Figure 6B:
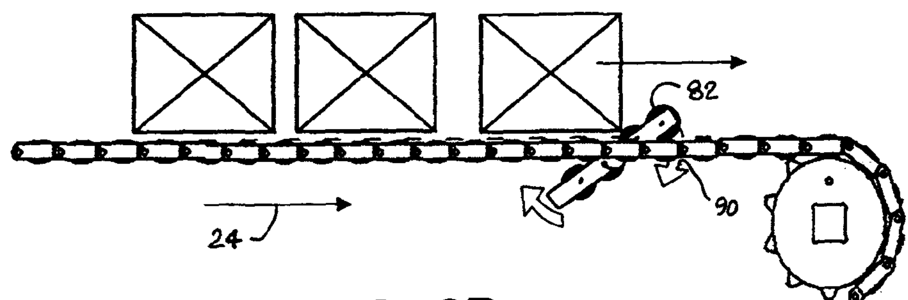
Figure 7A:
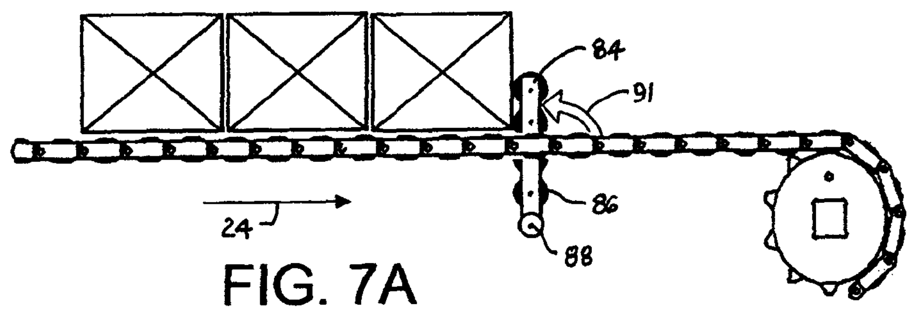
FIGS. 7A and 7B are side elevation views of still another version of the conveyor having a stop that pivots about a horizontal axis below the conveying surface, shown in accumulation and release positions.
Figure 7B:
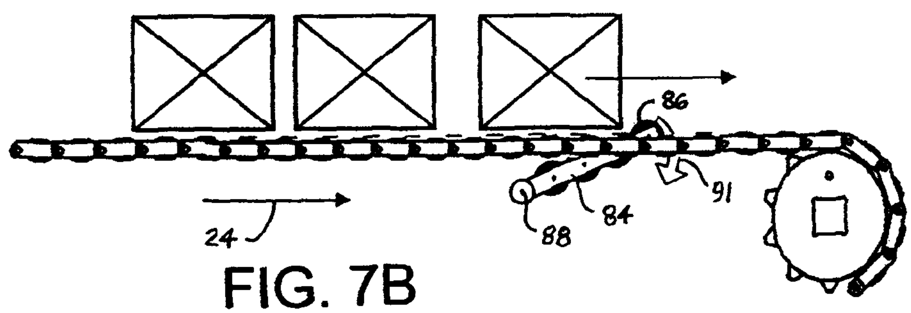

Another pivoting stop is shown in FIGS. 6A and 6B. In this example, a stop 76, which is positioned in a gap between two parallel belts 78, pivots on an axis 80 lying generally in the plane of the belts. The pivot axis is also perpendicular to the conveying direction 24. As the stop pivots from its upright and blocking position in FIG. 6A to its retracted position in FIG. 6B to release the accumulated articles, the lead article rolls on rollers 82 on the upstream face of the stop as the belt carries the articles downstream. A similar arrangement is shown in FIGS. 7A and 7B, in which a stop 84 with rollers 86 on its upstream face, pivots between blocking and retracted positions about an axis 88 below the belts. In both examples (FIGS. 6 and 7) the rollers rotate on axes perpendicular to the conveying direction and to the directions of motion 90, 91 of the stops.

Figure 8:
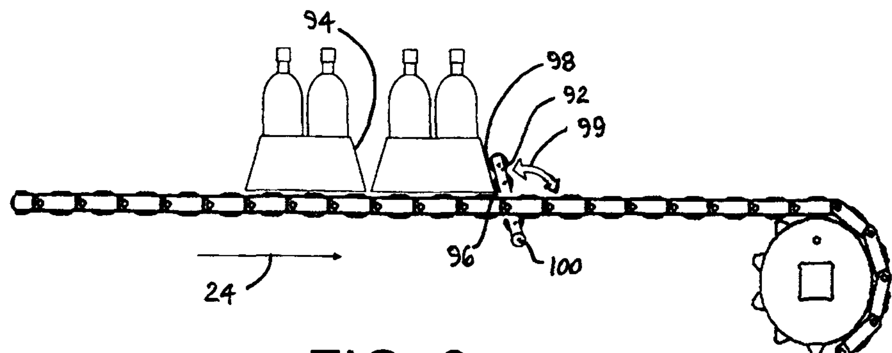
FIG. 8 is a side elevation view of another version of a conveyor having a stop that pivots about a horizontal axis to an angle oblique to the conveying surface.

While the stops described thus far are generally applicable to most articles, FIG. 8 shows a stop 92 especially adapted for use with articles that present a non-vertical leading surface 94 to the stop. In this version, the pivoting stop's blocking position is with the plane of its contact surface 96 oblique to the conveying direction 24 and the conveying surface to increase contact with the leading surface of the articles. The peripheries of rollers 98 on the upstream face of the stop define the contact surface. Like the rollers in the previous examples, the rollers in this example rotate on axes perpendicular to the conveying direction 24 and to the direction of motion 99 of the stop as it pivots on a horizontal axis 100.

Figure 9A:
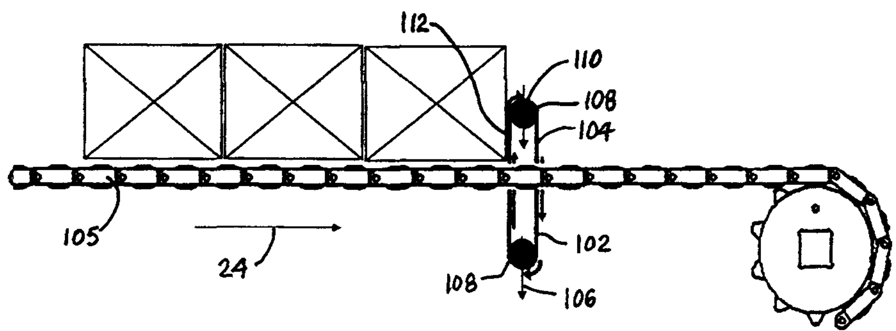
FIGS. 9A and 9B are side elevation views of another version of a conveyor having a flat belt forming the contact surface of a stop, shown in accumulation and release positions.
Figure 9B:
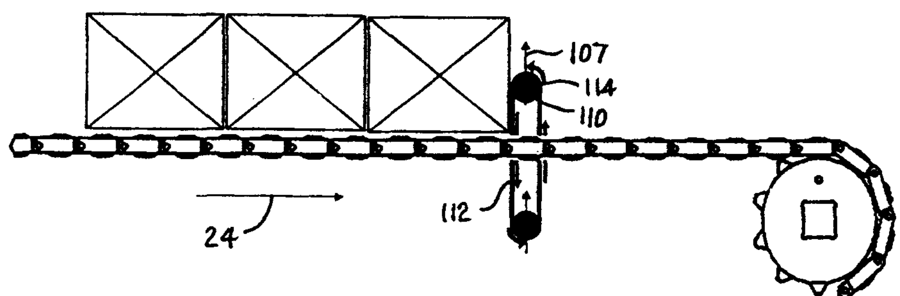

The previous examples of stops all form contact surfaces with rollers that gently handle the faces of conveyed articles especially as they are released. In the example of FIGS. 9A and 9B, a stop 102 is formed by a flat belt 104 positioned in a gap between two parallel belts 105. The stop moves between a blocking position (FIG. 9A) and a retracted position (FIG. 9B) by a lift lowering and raising the stop as indicated by arrows 106, 107. The belt is trained around a pair of idle pulley wheels 108, which rotate on horizontal axes 110 perpendicular to the conveying direction 24 and to the direction of motion of the stop. The outer surface of the belt on the upstream side of the stop forms its contact surface 112. As the stop is lowered from the blocking position in FIG. 9A, the frictional contact between the leading face of the accumulated articles and the contact surface of the belt causes the belt to remain generally stationary relative to the leading face of the articles. The pulley wheels merely ride along the interior of the belt loop to change its upper and lower ends as the stop is raised and lowered. Because the contact surface of the belt does not slide appreciably along the articles, they are not scratched. And, when the stop is fully retracted, the released articles can roll across the top 114 of the freely rotatable belt.

Figure 10:
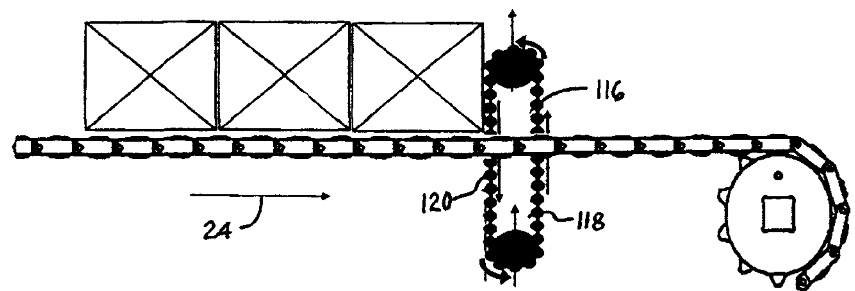
FIG. 10 is a side elevation view of another version of a conveyor having a roller-top belt forming the contact surface of a stop.
Figure 11:
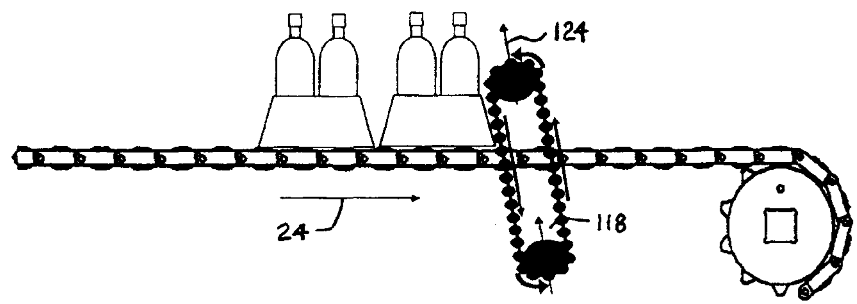
FIG. 11 is a side elevation view of another version of a conveyor as in FIG. 10 in which the roller-top belt is oriented at an oblique angle relative to the conveying direction during accumulation.

The flat belt of FIGS. 9A and 9B is replaced by a roller belt 116 in the stop 118 of FIG. 10. The peripheries of rollers 120 extending outward of the roller belt form the contact surface 122 of the stop. In other respects, the stops of FIGS. 9A-9B and 10 are identical. The roller-belt stop 118 is extended and retracted in an oblique direction 124 relative to the conveying direction 24 in FIG. 11 to accommodate articles with leading faces off vertical.

Figures 12A, 12B:
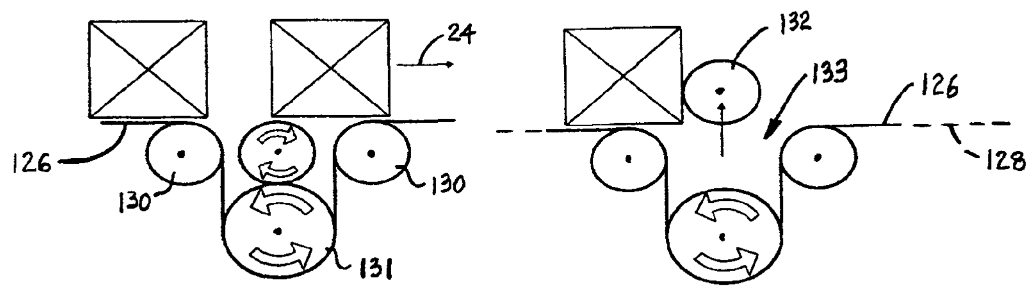
FIGS. 12A and 12B are side elevation views of a portion of another conveyor embodying features of the invention, including a roller used as a stop, shown in retracted and blocking positions.
Figure 12C:
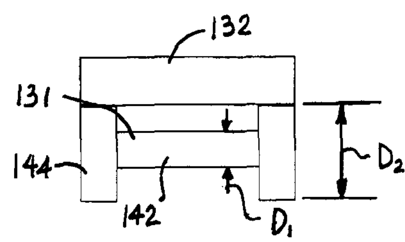
FIGS. 12C and 12D are side elevation views of two versions of stop rollers used in the conveyor of FIG. 12A.
Figure 12D:
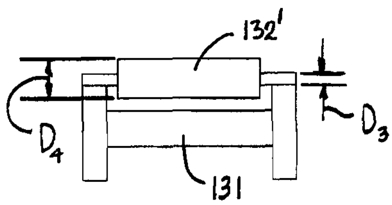

Another version of an accumulation-and-release conveyor is shown in FIGS. 12A and 12B. In this conveyor, a conveyor belt 126 advances in a general conveying direction 24. At an accumulation position along the conveying path, the belt is diverted below its general conveying level 128 by a set of rollers, such as load-bearing rollers 130 and a belt-driven roller 131. A stop, in the form of a roller 132, resides in a gap 133 in the main conveying surface and may be raised from the retracted, article-release position, shown in FIG. 12A, to a blocking, article-accumulation position, shown in FIG. 12B. The stop roller 132 rolls on the leading face of the accumulated articles without scratching them as the stop is raised and lowered. In the retracted position of the stop roller, released articles can ride across the gap atop the stop roller, which forms a portion of the interrupted conveying surface by being positioned generally tangent to the conveying level 128. And, as shown in FIG. 12A, the stop roller 132 can be driven by the belt-driven roller 131 to accelerate the released article across the gap. The tangential speed of the stop roller 132, which determines the acceleration of the released article, may be set by providing either roller or both rollers with portions of different diameters, as in the examples of FIGS. 12C and 12D. In the example of FIG. 12A, the spool-shaped belt-driven roller 131 has a belt-engaging interior portion 142 with a diameter $D_1$ and flanking end portions 144 with a greater diameter $D_2$. The interior portion is contacted by and driven by the belt. The tangential speed of the interior portion equals the belt speed. Consequently, the tangential speed of the end portions is $D_2/D_1$ times the belt speed and the tangential speed of the interior portion. The stop roller 132, in contact with the peripheries of the larger-diameter end portions of the belt-driven roller, also has the same increased tangential speed. If a stop roller 132' having an interior article-contacting portion with a diameter $D_4$ and flanking end portions with a smaller diameter $D_3$ contacting the end portions of the belt-driven roller is used as in FIG. 12D, the tangential speed of the article-contacting portion of the stop roller is multiplied further by a factor of $D_4/D_3$. This gearing effect may be used to rapidly accelerate released articles at speeds greater than the speed of the belt.

Figure 13:
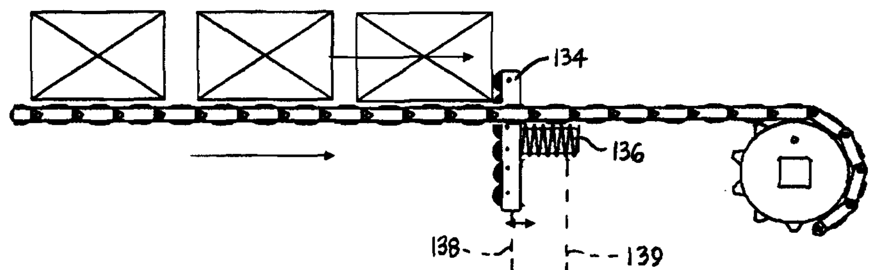
FIG. 13 is a side elevation view of another version of a conveyor having a stop with a dampened-spring shock absorber.
Figure 14:
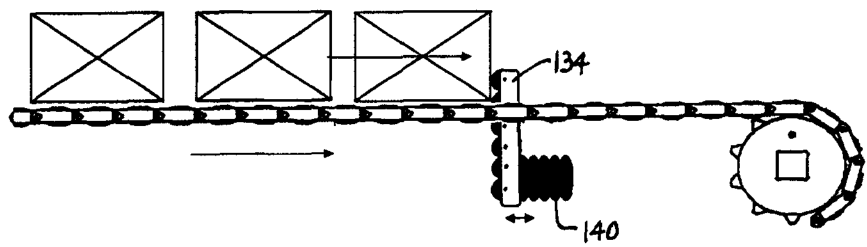
FIG. 14 is a side elevation view of a conveyor as in FIG. 13 with an air-cushion shock absorber.

Other versions of stops are shown in FIGS. 13 and 14. In FIG. 13, a stop 134 is mounted to a shock absorber 136, in the form of a spring and dampener system. When the stop is in the blocking position shown, the impact of articles hitting the stop and trailing articles bumping into a mass of articles accumulated against the stop is lessened by the shock absorber. The spring biases the stop in the upstream direction against accumulated articles. The spring provides a range of motion to the stop between an upstream position 138 and a downstream position 139, at which the spring is compressed. The dampener dampens oscillations in the spring system. The stop 134 in FIG. 14 uses an air cushion 140 as the shock absorber, instead of the dampened-spring system of FIG. 13.

The stops described may be translated or pivoted by conventional pneumatic, hydraulic, or electromechanical devices. The conveyors are shown as conveyor belts, both flat-top and roller-top belts, but other conveying media, such as roller conveyors and slat conveyors may be used with the stops described. And the raising and lowering of the stops may be controlled by the outputs of article-detecting sensors positioned along the conveyor at strategic locations. Furthermore, the rollers and the stops could be universally rotatable roller balls rather than the axle-mounted rollers depicted in the drawings. So, as these few examples suggest, many variations of the exemplary versions described in detail are possible within the scope of the invention.

What is claimed is:

1. A conveyor comprising:

a conveying surface conveying articles in a conveying direction;

a retractable stop disposed along the conveying surface and movable in a direction of motion between a blocking position stopping conveyed articles and a retracted position allowing conveyed articles to be conveyed in the conveying direction;

wherein the retractable stop has a contact surface arranged to contact conveyed articles without sliding on the conveyed articles as the retractable stop moves between the blocking and retracted positions and releases conveyed articles to be conveyed in the conveying direction;

wherein the conveying surface is separated across a gap and wherein the retractable stop includes a roller movable through the gap between the blocking and retracted positions;

a second roller disposed in the gap and wherein the conveying surface is formed by a conveyor belt diverted below the level of the conveying surface in the gap around the second roller and wherein the second roller is driven by the conveyor belt and drives the roller in the retractable stop when the stop is in the retracted position.

2. A conveyor as in claim 1 wherein the second roller has a belt-engaging interior portion with a first diameter and flanking end portions with a greater second diameter.

3. A conveyor as in claim 1 wherein the level of the conveying surface is tangent to the top of the roller in the retractable stop when in the retracted position.

4. A conveyor as in claim 1 wherein at least one of the second roller and the roller in the retractable stop has portions of different diameters.

* * * * *